United States Patent
Moudgill et al.

(10) Patent No.: US 8,056,064 B2
(45) Date of Patent: Nov. 8, 2011

(54) METHOD FOR RECOGNITION OF ACYCLIC INSTRUCTION PATTERNS

(75) Inventors: Mayan Moudgill, White Plains, NY (US); Vladimir Kotlyar, Stamford, CT (US)

(73) Assignee: Aspen Acquisition Corporation, San Diego, CA (US)

( * ) Notice: Subject to any disclaimer, the term of this patent is extended or adjusted under 35 U.S.C. 154(b) by 1280 days.

(21) Appl. No.: 11/573,563

(22) PCT Filed: Aug. 11, 2005

(86) PCT No.: PCT/US2005/028463
§ 371 (c)(1),
(2), (4) Date: Feb. 12, 2007

(87) PCT Pub. No.: WO2006/020729
PCT Pub. Date: Feb. 23, 2006

(65) Prior Publication Data
US 2008/0127148 A1 May 29, 2008

Related U.S. Application Data

(63) Continuation-in-part of application No. 10/382,578, filed on Mar. 7, 2003.

(60) Provisional application No. 60/425,251, filed on Nov. 12, 2002, provisional application No. 60/600,999, filed on Aug. 12, 2004.

(51) Int. Cl.
*G06F 9/45* (2006.01)
(52) U.S. Cl. .................. 717/151; 717/140; 717/158
(58) Field of Classification Search .................. None
See application file for complete search history.

(56) References Cited

U.S. PATENT DOCUMENTS

| | | | |
|---|---|---|---|
| 5,905,662 A | 5/1999 | Shiraishi |
| 6,631,392 B1 | 10/2003 | Jiang et al. |
| 6,687,898 B2 | 2/2004 | Chen et al. |
| 7,171,438 B2 | 1/2007 | Moudgill et al. |

OTHER PUBLICATIONS

Kurt Keutzer, Wayne Wolf, "Anatomy of a Hardware Compiler", © 1988.*
Office Action received Aug. 20, 2010 in Chinese App. No. 200580027382.6.
ISR dated Nov. 27, 2007 in PCT/US05/28463.
IPRP dated Dec. 17, 2007 in PCT/US05/28463.
Office Action dated May 4, 2006 in U.S. Appl. No. 10/382,578.
Office Action dated Aug. 4, 2006 in U.S. Appl. No. 10/382,578.
Kuetzer, Kurt et al., "Anatomy of a Hardware Compiler", ACM, Jun. 22, 1988, pp. 95-102.

* cited by examiner

*Primary Examiner* — Chuck Kendall
(74) *Attorney, Agent, or Firm* — Knobbe Martens Olson & Bear LLP (57) ABSTRACT

A method which determines by an optimizing compiler whether any variable in the given program equals to the given acyclic mathematical function applied to given variables in the program and the method includes expressing the bits of the value of the function as a Boolean function of the bits of the inputs and expressing for every variable and statement the value taken by v when s is executed as a Boolean function and expressing, for every statement the condition under which the statement is executed as a Boolean function, and Finally, a determination is made using a Boolean satisfiability oracle of whether, for the given variable and program statement, the a particular Boolean expression holds and a determination is of whether for a given variable and program statement whenever the predicate and the condition are true.

38 Claims, 2 Drawing Sheets

METHOD FOR RECOGNITION OF ACYCLIC INSTRUCTION PATTERNS

CROSS REFERENCE

The present application claims the benefit of the U.S. provisional application Ser. No. 60/425,251 filed Nov. 12, 2002; is a continuation-in-part of U.S. patent application Ser. No. 10/382,578 filed Mar. 7, 2003; and claims the benefit of the U.S. provisional application Ser. No. 60/600,999 filed Aug. 12, 2004, all of which are incorporated herein by reference.

FIELD OF THE INVENTION

The present disclosure is directed to pattern recognition of instruction s in a program and more specifically to recognition of acyclic patterns by an optimizing compiler.

BACKGROUND AND SUMMARY OF THE INVENTION

Reference made herein and listed at the end are incorporated herein as necessary for understanding and implementing of the present disclosure.

Fixed-point saturating arithmetic is used widely in media and digital signal processing applications. Given a B-bit two's complement operation OP, its saturating counterpart detects overflow and sets the result to the limits of the representable number range:

$$OP_{sat}(x, y) = \begin{cases} MaxB & \text{if } OP(x, y) \text{ overflows} \\ MinB & \text{if } OP\}(x, y) \text{ underflows} \\ OP(x, y) & \text{otherwise} \end{cases} \quad (1)$$

For example, speech codecs in the GSM standard are expressed in terms of saturating arithmetic operations (Refs 1 and 2). A number of modern processor architectures, such as TI C6x, Intel IA-32 and ARM implement saturating arithmetic instructions.

Standard programming languages, such as ANSI C, do not provide operators for saturating arithmetic. Typically, application developers include libraries of functions or macros that implement these operations in terms of basic two's complement arithmetic. In order to obtain high performance on a given architecture, these libraries have to be coded either in assembly or using vendor-specific libraries or language extensions. This clearly complicates software development and maintenance. Various language extensions and standards have been proposed (Ref. 3). Their future is unclear, given the usual reluctance of established vendors to standardize. Thus, programmers are forced into the trade-off between portability and efficiency.

The way to resolve this trade-off is for a compiler to automatically recognize code fragments that implement saturating arithmetic and convert them into appropriate machine instructions. For this solution to be effective, the recognition algorithm must be robust and work across different coding styles. One can start with simple pattern matching on abstract syntax trees.

However, the limitations of such approach become evident as one consider various implementations of saturating addition. Examples are show in U.S. patent application Ser. No. 10/382,578. In order to prove, two saturated addition instructions are both equivalent to the definition in equation 1, one needs to prove equivalence between the results of the sequences of various bit manipulation and logical operations. Instead of an ad-hoc approach, a method that has a formal algebraic foundation is needed.

In the U.S. patent application Ser. No. 10/382,578, a method is described for recognition of saturated addition and subtraction specifically. The present disclosure recognizes that the principles in the previous application are applicable to any acyclic operation and may be expressed in generic terms.

The method of the present disclosure determines by an optimizing compiler whether any variable in the given program equals to the given acyclic mathematical function $f(x,y, \ldots )$ applied to the given variables x, y, . . . in the program. In one embodiment, the method includes expressing the bits of the value of the function $f(x,y,\ldots)$ as a Boolean function of the bits of the inputs x, y, . . . ; expressing, for every variable v and program statement s, the value taken by v when s is executed as a Boolean function $V(s,v)(x, y, \ldots)$ of the bits of x, y, . . . ; and expressing, for every statement s, the condition under which the statement is executed as a Boolean function $C(s)(x, y, \ldots)$ of the bits of the inputs x, y, . . . . Finally, a determination is made using a Boolean satisfiability oracle of whether, for the given variable v and program statement s, the following Boolean expression holds: $C(s)(x,y, \ldots) \Rightarrow V(s,v)(x,y \ldots) = f(x,y, \ldots)$.

In a second embodiment, the method includes expressing the value of $f(x,y, \ldots)$ as a plurality of functions $f_j(x,y, \ldots)$ having the corresponding predicate $P_j(x,y, \ldots)$; expressing, for every variable v and program statement s, the value taken by v when s is executed as a plurality of functions $V_j(s,v)(x,y, \ldots)$, one for each predicate $P_j(x,y, \ldots)$; and expressing, for every statement s, the condition under which the statement is executed as a plurality of functions $C_j(s)(x,y, \ldots)$, one for each predicate $P_j(x,y, \ldots)$. Finally, a determination is of whether for the given variable v and program statement s, $V_j(s,v)(x,y, \ldots) = f_j(x,y, \ldots)$ whenever the predicate $P_j(x,y, \ldots)$ and the condition $C_j(s)(x,y, \ldots)$ are true.

In either embodiment, the program may be transformed so that the value of each variable v that takes on the value of the function $f(x,y, \ldots)$ is computed by the available function $f(x,y, \ldots)$ by adding the invocation of the instruction $t=f(x,y,\ldots)$; and replacing each reference to variable v at each statement s, such that the value of v at s equals $f(x,y,\ldots)$, with the reference to t. The instructions that are unused after the program transformation are eliminated by dead-code elimination. Where the mathematical function $f(x, y, \ldots)$ is computable in hardware, the program may be transformed so that the value of each variable v that takes on the value of the function $f(x,y, \ldots)$ is computed by the available hardware instruction for $f(x,y, \ldots)$.

These and other aspects of the present invention will become apparent from the following detailed description of the invention, when considered in conjunction with accompanying drawings.

DETAILED DESCRIPTION OF THE PREFERRED EMBODIMENTS

A set of techniques will be described for automatic recognition of saturating arithmetic operations. In most cases the recognition problem is simply one of Boolean circuit equivalence. Given the expense of solving circuit equivalence, a set of practical approximations based on abstract interpretation is also described.

Experiments show that the present techniques, while reliably recognizing saturating arithmetic, have small compile-time overhead. The present method is not limited to saturating arithmetic, but is directly applicable to recognizing other idioms, such as add-with-carry and arithmetic shift.

Saturating operations can be defined by acyclic program fragments. Therefore, their results and intermediate values can be described bit-wise as Boolean expressions in terms of the inputs. This observation suggests the following solution:

Given an acyclic candidate code fragment, extract Boolean expressions that describe the values of its variables.

Using a Boolean expression equivalence oracle, test whether any of the expressions match the template.

To test the practicality of this method, a recognition algorithm for saturating addition employing a binary decision diagram package BuDDy (ref 4) as the oracle was implemented. The algorithm picks a candidate two's complement addition operation z=x+y and attempts to discover which values in the program that depend on the operation carry its saturated value. For each edge in the control-flow graph of the program, the algorithm computes (whenever possible) the condition under which the edge is executed. The condition is expressed as a Boolean function over the bits of x, y. For each variable, the algorithm computes its value at every edge as a Boolean function over the bits of x, y.

An outline of the algorithm based on BDDs is:

ExactMatch (G: program CFG, OP: the operation to match) {repeat{
Pick candidate values x and y
if none found, exit
Let F be the Boolean expression for the bits of OP(x,y)
For every edge e and variable v:
Compute edge condition C(e)
Compute variable value V(e,v)
Identify program edges e and variables v such that:
$\forall x, y: C(e)(x,y) \Rightarrow (F(x,y)=V(e,v)(x,y))$
(with Boolean expressions being tested via BDDs)

Figure 1:
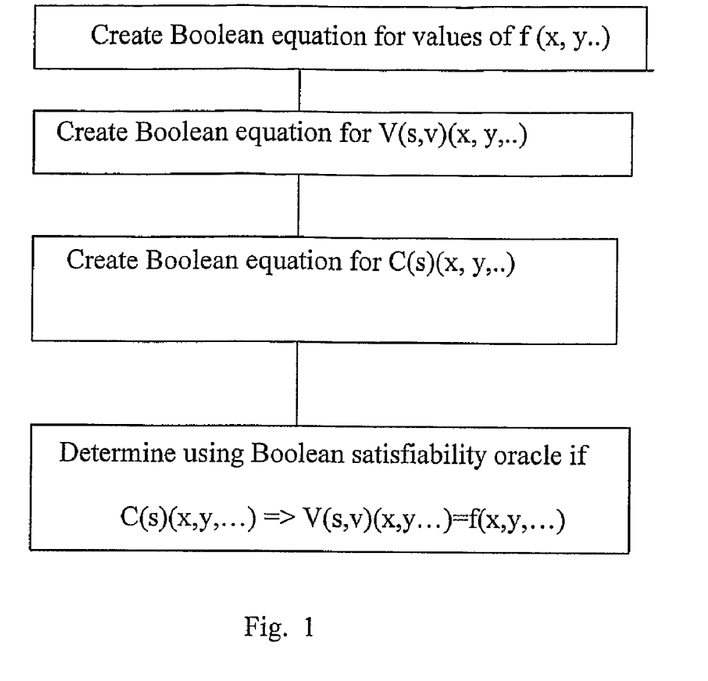
FIG. 1 is a flow chart of a first embodiment of a method incorporating the principles of the present disclosure.

For every candidate addition operation OP(x, y), the algorithm forms the Boolean expression F(x,y) for the saturated value. It also expresses conditions C(e) under which edges e are executed and values of variables V(e,v) in terms of the inputs to the candidate operation. The algorithm then searches for program locations (edges) and variables that carry the saturated value, when they are executed. Computation of edge conditions and variable values can be phrased as a standard abstract interpretation problem (Refs. 5, 6 and 7). The domain of abstract interpretation in this case is the set of all Boolean functions over the candidate inputs. This method of embodiment one is shown in FIG. 1.

The time to detect saturating addition using this first embodiment is large—for instance, trying to prove an add was a saturating add required 10 milliseconds per attempt. Even after adding a heuristic that filtered out the majority of adds, using BDDs could add tens of seconds to the compile-time. An attempt was made to recognize saturating multiplication using this method, but ran out of memory while forming the BDD for the initial multiply. With improvements in hardware and/or Boolean expression equivalence or satisfiability oracle, the first embodiment can be used for saturating multiplication, for example.

Given the difficulty using the current hardware and Boolean solvers, a fast approximate algorithm to find saturating arithmetic operations was developed as a second embodiment. Approximations to the Boolean expressions that describe the values of program variables are constructed. By construction, the approximations are bounded in size and can be quickly tested for equivalence.

A given saturating operation (e.g. addition) can be implemented using a number of idioms (e.g. full-range, sub-range) and each idiom can be implemented in a number of ways. Each idiom can be described in terms of simple properties of statements and variables. This allows proving equivalence of program fragments without solving general Boolean satisfiability.

The problem of idiom recognition may be defined as follows:

given a statement that computes the two's complement operation: z=x OP y given the definition of the saturated value in terms of the inputs x, y and the result z. The definition must be in the predicated form:

$$OPsat(x, y, z) = \begin{cases} f_1(x, y, z) & \text{if } Condition_1(x, y, z) \\ f_2(x, y, z) & \text{if } Condition_2(x, y, z) \\ \ldots \end{cases}$$

The goal is to identify values in the program that equal to $OP_{sat}(x,y,z)$. For example, full-range addition idiom can be defined as:

$$addsat(x, y, z) = \begin{cases} \text{MAX} & \text{if } (x \geq 0) \wedge (y \geq 0) \wedge (z < 0) \\ \text{MIN} & \text{if } (x < 0) \wedge (y < 0) \wedge (z \geq 0) \\ \ldots \end{cases}$$

In the L_add function from the GSM EFR codec shown below, the value of the L_var_out variable at the return statement on line 14 matches this definition. If this can be proved automatically, then the return value can be computed using a saturating add instruction (if one is available on the target architecture):

```
1:  Word32 L_add(
2:      Word32 L_var1, Word32 L_var2
3:  ) {
4:      Word32 L_var_out;
5:      L_var_out = L_var1 + L_var2;
6:      if (((L_var1 ^ L_var2) & MIN_32)= =0)
7:      {
8:          if ((L_var_out ^ L_var1) & MIN_32)
9:          {
10:             L_var_out =
11:                 (L_var1 < 0) ? MIN_32 : MAX_32;
12:         }
13:     }
14:     return NATIVE_ADDSAT(L_var1,L_var2);
15: }
```

Dead-code elimination would then produce the optimal code:

```
1: Word32 L_add(
2:     Word32 L_var1, Word32 L_var2
3:     ) {
```

-continued

```
4:    return NATIVE_ADDSAT(L_var1, L_var2);
5: }
```

Initially, the input program has been lowered into three-address form represented as a Control-Flow Graph G=(N, E) of statements. The nodes include the unique start and end nodes, assignment statements of the form x:=OP (y, z), switches of the form IF(x≠0) and explicit control-flow merges.

If only scalar types available are 32-bit int and 16-bit short, the derivations can be easily generalized to operations of other bit-widths, such as 8-bit signed and unsigned pixel operations.

Given a program location and variables x and y, and the task is to identify variables v which on all executions of the program carry the value of the given function f(x,y). Formally, we are given:

A candidate program edge $e_0$ and candidate variables x, y.

A heuristic witness z. The witness helps simplify the predicates. In the case of saturating operations, the witness is usually the result of the non-saturating operation.

pattern function f(x,y,z) represented by a disjunction of implications:

$$f(x, y, z) = \begin{cases} f_1(x, y, z) & \text{if } P_1(x, y, z) \\ f_2(x, y, z) & \text{if } P_2(x, y, z) \\ \ldots \\ f_n(x, y, z) & \text{if } P_n(x, y, z) \end{cases} \quad (2)$$

The goal is to identify such edges e and variables v, that the value of v when e is executed is $f(x_0,y_0,z_0)$ where $x_0$, $y_0$ and $z_0$ are the values of the candidate variables at the most recent execution of the candidate edge $e_0$.

In this embodiment for a given candidate edge and candidate variables, perform abstract interpretation once for each condition in equation 2. During each successive instance of abstract interpretation, compute approximations to the variable values V(e,a) and edge conditions or assertions A(e) under the assumption that the predicate $P_j$ holds true.

An edge assertion A(e) is the condition that holds true if the program edge is executed. The edge assertions A(e) is computed as functions of the candidates x, y and the witness z. Variable value V(e,v) represents knowledge about the value of v when the edge e is executed. V(e,v) is also a function of x, y and z.

The program is modified to save at the candidate edge $e_0$ the values of x, y and z into the temporaries $x_0$, $y_0$, $z_0$. Then at every edge e the assertion assert $(A(e)(x_0,y_0,z_0))$ and, for every variable v, the assertion assert$(v==V(e,v)(x_0,y_0,z_0))$ will be satisfied.

Given the above definitions, the variable a carries the value of the pattern function f(x,y,z), if the following holds:

$$\forall j: \forall x,y,z: (A(e)(x,y,z) \wedge P_j(x,y,z)) \Rightarrow (V(e,a)(x,y,z)=f_j(x,y,z)) \quad (3)$$

Figure 2:
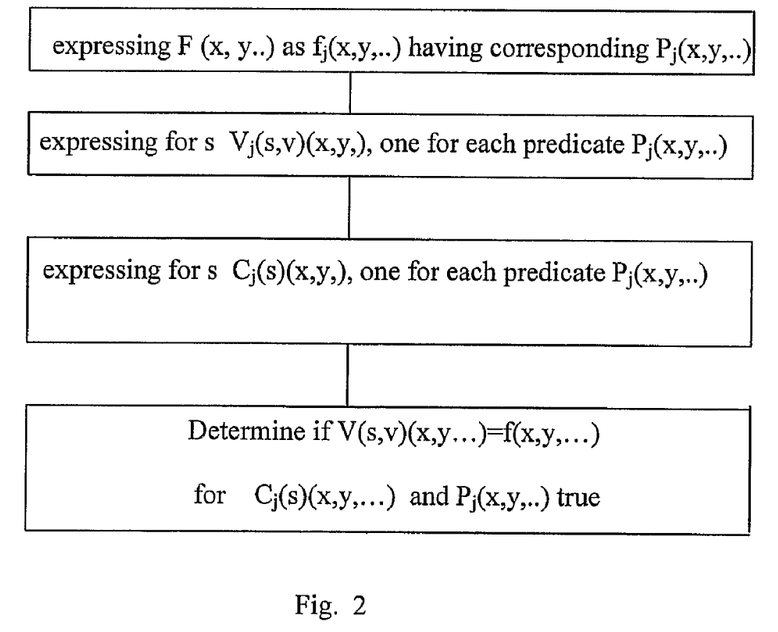
FIG. 2 is a flow chart of a first embodiment of a method incorporating the principles of the present disclosure

In other words, for each condition $P_j$ in equation 2 is tested either (a) the edge e is not executed, or (b) the edge is executed and the variable a equals to the appropriate case $f_j$. The second embodiment is illustrated in FIG. 2.

To approximate the assertions and the values, two lattices are used: one to approximate conditions or predicates and one to approximate values. Φ denotes the lattice of predicates and Λ denotes the lattice of values. The lattices must satisfy the following requirements:

Both Φ and Λ must include the top and bottom elements. Both must define the meet operator and the comparison operator. The comparison operator is necessary for a well-formed lattice. The meet operator is used at program merge points.

Φ must define the conjunction, disjunction and negation. Φ must contain both the true value and false value. Φ must be sound in that the usual algebraic rules for the conjunction, disjunction, truth and falsehood must hold.

For every arithmetic operation OP in the intermediate program language, the lattice Λ must define an interpretation OP: Λ×Λ→Λ. (we assume that all operations are binary.)

Two functions that link the values to the respective predicates:

The MayNonZero: Λ→Φ function tests whether a value can possibly be non-zero.

The MayZero: Λ→Φ function tests whether a value possibly be zero.

The MayNonZero and MayZero functions do not have to produce contradictory results. Sometimes it might be necessary to approximate a value as possibly being zero and possibly being non-zero at the same time.

Figure 3:
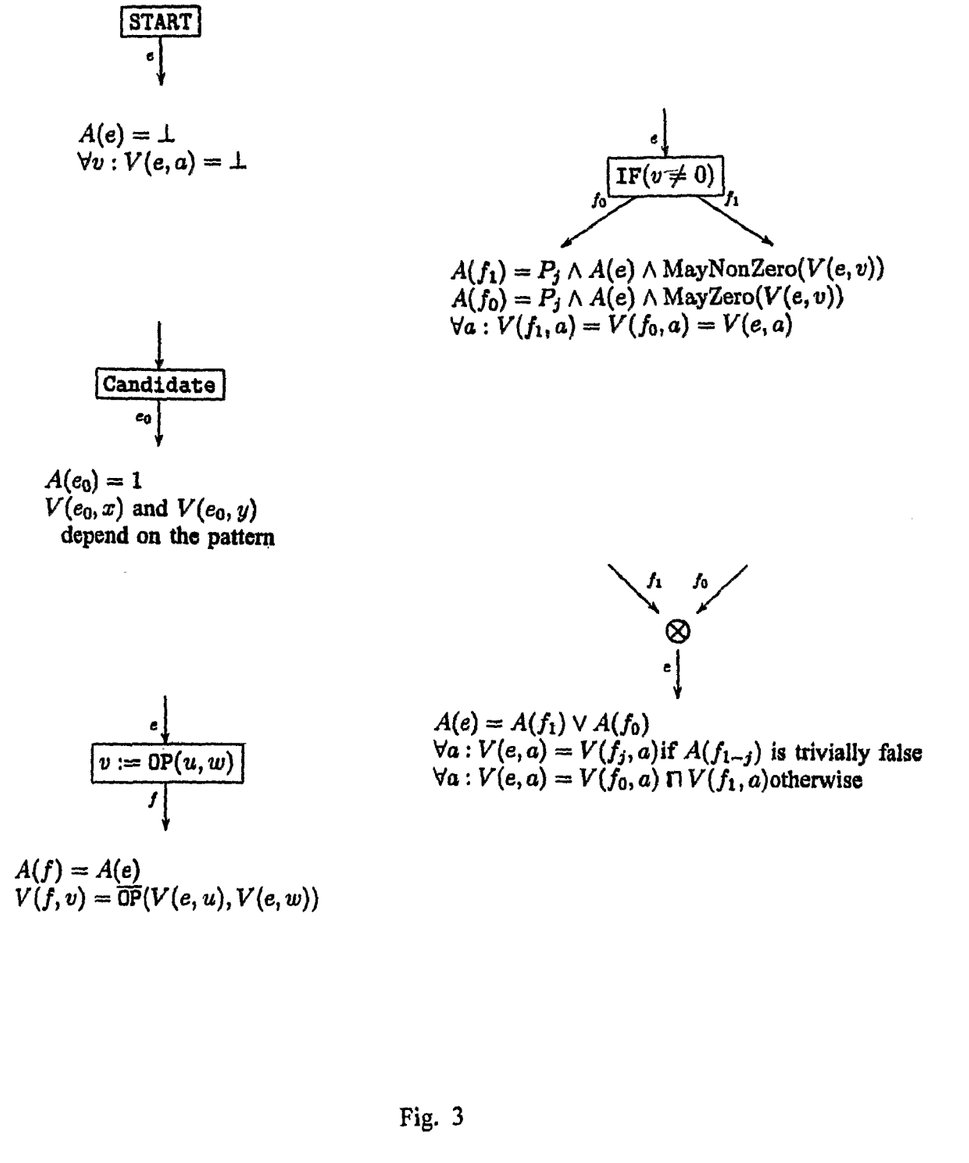
FIG. 3 is a group of diagrams and data flow.

Given these definitions, abstract interpretation of a program in terms of the edge assertions A(e) and variable values V(e,a) relative to the candidate edge $e_0$, the candidate variables x, y and the witness z is defined. The equations are shown in FIG. 3. This is a fairly standard set of equations. The equations for merge statements allow for Wegman-Zadeck style one-side conditional propagation (Refs 8 and 9).

The overall algorithm is summarized as follows:

```
ApproxMatch ( G : program CFG, OP : the operation to match ) \{
  repeat \{
    Heuristically pick candidate values x, y and the witness z
    if none found, exit
    For each implication Pj(x,y,z) ⇒ fj (x,y,z) (in the pattern function) {
      Assume Pj is true
      Compute edge assertions A(e) and variable values V(e,v) using abstract interpretation
      Identify edges e and variables v that satisfy:
      ∀ x, y, z : (A(e)(x,y,z) ∧ Pj(x,y,z)) ⇒ (V(e,a)(x,y,z) = fj(x,y,z))
  \}\}\}
```

Examples of how the present methods applies to multiplication and full-range and sub-range addition follow. It is straight-forward to extend our techniques to recognition of saturating subtraction. Further examples to be illustrated includes the recognition of add with carry ane arithmetic shift. The method is also applicable to operations such as clipping.

A. Full-range Saturating Addition

To match full-range saturating addition, start with a non-saturating addition operation z=x+y. The input variables x and y are the candidate variables. The output variable z is the witness. The pattern function is:

$$f(x, y, z) = \begin{cases} \text{MAX32} & \text{if } x + y \text{ overflows} \\ \text{MIN32} & \text{if } x + y \text{ underflows} \\ z & \text{otherwise} \end{cases} \quad (4)$$

The overflow and underflow predicates can be defined through sign tests:

$$f(x, y, z) = \begin{cases} MAX32 & \text{if } (x \geq 0) \wedge (y \geq 0) \wedge (z < 0) \\ MIN32 & \text{if } (x < 0) \wedge (y < 0) \wedge (z \geq 0) \\ z & \text{otherwise} \end{cases} \quad (5)$$

The comparison operators in this definition use 32-bit two's complement arithmetic.

Various implementations of full-range saturating addition either branch on predicates in terms of the sign bits of x, y and z, and/or perform bit manipulation of the sign bits. Therefore, edge assertions are represented as predicates of the sign bits (and more). Additionally, keep track of whether the section [p,p+n] of bits of any variable v is equal to the section [q,q+n] of bits of x, y or z.

The lattice $\Phi$ is the set of all predicates in terms of the six input variables:

$$\sigma_x \equiv (x < 0) \text{ the sign bit of } x \quad (6)$$
$$\sigma_y \equiv (y < 0) \text{ the sign bit of } y$$
$$\sigma_z \equiv (z < 0) \text{ the sign bit of } z$$
$$\zeta_x \equiv (x = 0)$$
$$\zeta_y \equiv (y = 0)$$
$$\zeta_z \equiv (z = 0)$$

The value lattice $\Lambda = \Phi^{32} \times \Gamma$ is built as product of two lattices:
- $\Phi^{32}$ is the lattice of all vectors of length 32 of predicates in $\Phi$. $\Phi^{32}$ is used to approximate the bits of variables in terms of the sign bits of x, y and z.
- $\Gamma = \{\top \ x_{p,q,n}, y_{p,q,n}, z_{p,q,n}, \bot\}$ is used to approximate variables as sub-ranges of bits of x, y and z. The approximation of a variable v as $x_{p,q,n}$ means that the bits v[p, p:n] of v are same as the bits x[q,q+n] of x.

Each element in $\Lambda$ is a pair $\langle v, \rho \rangle$ where $\langle v, \rho \rangle$ where $v \in \Phi^{32}$ and $\rho \in \Gamma$. $v$ is the vector component and $\rho$ is the bit range component.

The interpretations OP of arithmetic operators in terms of the vector components are rather straight-forward, namely for any arithmetic operation, a predicate can be derived for each bit of the result. Heuristically, do not interpret multiplication, division and remainder operations, other than the ones that can be converted to a shift or bit-wise. The results of these operations are (conservatively) set to vectors of $\bot$.

The interpretations in terms of bit range components are rather simple, too. Constant shifts, and bit-wise operations with a constant produce outputs that are not $\bot$. All other operations are not interpreted.

As an example of interpretation, consider the equality comparison: c:=(a=0). If the bit range component of a is of the form $v_{0,0,31}$ for $v \in x, y, z$, then the vector component of c must be set to: $\langle 0 \ldots 0 \zeta v : \rangle$.

The MayNonZero and MayZero operators test whether representation of the input value can be non-zero or zero, respectively. MayNonZero forms the disjunction of all the bits in the $\Phi^{32}$ component. If the disjunction is not trivially false, then MayNonZero returns 1. Similarly, if the disjunction is not trivially true, then MayZero returns 1.

The conditions $P_j$ for the pattern function are trivially encoded:

$$Overflow(x, y, z) \equiv \neg \sigma_x \wedge \neg \sigma_y \wedge \neg \sigma_z \quad (7)$$
$$Underflow(x, y, z) \equiv \sigma_x \wedge \sigma_y \wedge \sigma_z$$
$$NoOverflow(x, y, z) \equiv \neg Overflow \wedge \neg Underflow$$

The initial values for the candidate edge $e_0$ are:

$$V(e_0, x) = \langle\langle \sigma_x \bot \ldots \bot \rangle x_{0,0,31} \rangle$$
$$V(e_0, y) = \langle\langle \sigma_y \bot \ldots \bot \rangle y_{0,0,31} \rangle$$
$$V(e_0, z) = \langle\langle \sigma_z \bot \ldots \bot \rangle z_{0,0,31} \rangle \quad (8)$$

To illustrate how abstract interpretation works in this instance, consider the following example:

```
1: int addsat_32bit (int x, int y) {
2:   int z = x + y;
3:   int t1 = ( ~(x ^ y) & (x ^ z) );
4:   int t2 = MIN32 & t1;
5:   if ( t2 ) {
6:     int t3 = (x >> 31) & 1;
7:     z = MAX32 + t3;
8:   }
9:   return z;
10: }
```

Only the most-significant bit of t1 (line 3) can be represented:

$$V_1 = \langle\langle\langle \neg(\sigma_x \oplus \sigma_y)) \hat{} (\sigma_x \oplus \sigma_z)), \bot, \ldots, \bot \rangle, \bot \rangle$$

Conjunction with MIN32 (i.e. 0x80000000) isolates the most significant bit of t1. Thus the representation of the value of t2 on line 4 is:

$$V_2 = \langle\langle\langle \neg(\sigma_x \oplus \sigma_y)) \hat{} (\sigma_x \oplus \sigma_z)), 0, \ldots, 0 \rangle, \bot \rangle$$

The condition under which statements on lines 6 and 7 are executed is given by the disjunction of the bits of t2, since the implicit test is t2≠0:

$$MayNonZero(V_2) = (\neg(\sigma_x \oplus \sigma_y)) \hat{} (\sigma_x \oplus \sigma_z))$$

Therefore, the assertion for the lines 6 and 7 is:

$$A_1 = P \wedge MayNonZero(V_2)$$
$$P \wedge (\neg (\sigma_x \oplus \sigma_y)) \wedge (\sigma_x \oplus \sigma_z))$$

where P is the current assumption (overflow, underflow, neither) as given by equation 7. It is easy to see that $A_1 = 0$ if we assume "neither" and it is non-zero otherwise. Thus, under the "neither" assumption only the assignment to z at the candidate edge reaches the return statement (line 9).

The computed approximation for t3 on line 6 is:

$$V_3 = \langle\langle 0, 0 \ldots 0, \sigma_x \rangle, x_{0,31,0} \rangle$$

I.e. t3 carries the sign (31st) bit of x. $\sigma_x = 0$ under the assumption of overflow. Therefore, z is assigned the constant MAX32. When underflow is assumed, $\sigma_x = 1$ and z is assigned MAX32+1==MIN32.

All of the above proves that the return statement is reached by the value MAX32 when overflow occurs, MIN32 when underflow occurs and the original value of z, otherwise. This, in turn, proves that the return statement is reached by the saturated value.

B. Sub-range Addition

The pattern function for sub-range addition is:

$$f(x, y, z) = \begin{cases} \text{MAX16} & \text{if } z > \text{MAX16} \\ \text{MIN16} & \text{if } z < \text{MIN16} \\ z & \text{otherwise} \end{cases} \quad (9)$$

The comparisons in this definition use 32-bit two's complement arithmetic.

Sub-range addition is simpler. The candidate addition z=x+y where x and y are declared as 16-bit "shorts". Overflow, underflow and no-overflow conditions are represented in terms of range tests on z:

$$\text{Overflow}(x, y, z) \equiv (z \in ]\text{Max16}, +\infty[)$$
$$\text{Underflow}(x, y, z) \equiv (z \in ]-\infty, \text{Min16}[$$
$$\text{NoOverflow}(x, y, z) \equiv (z \in [\text{Min16}, \text{Max16}])$$

Therefore, range propagation is performed for the overflow and underflow assumptions and propagate the property "this variable equals to z" for the no-overflow assumption.

C. Multiplication

Consider an implementation of fixed-point saturating multiplication (16-bit into 32-bit):

```
1: #define MAX32 (0x80000000)
2: int mult_sat (short x, short y) {
3:     int z = x * y;
4:     if (z == 0x40000000) {
5:         z = MAX32;
6:     }
7:     else {
8:         z = 2*z;
9:     }
10:    return z;
11: }
```

In fact, a more general idiom is that of "multiplication shifted by k":

```
1: #define MAX32 (0x80000000)
3: #define k (.....)
2: int mult_sat_k (short x, short y) {
3:     int z = x * y;
4:     if (z == 0x40000000) {
5:         z = MAX32;
6:     }
10:    return (z >> (k-1));
11 }
```

This computes the product of x and y represented as a fixed-point number in 32-k bits. Typically k=16.

In order to determine what values are assigned when overflow occurs, simply perform constant propagation with the additional mappings defined at the $V(e_0,x) = 0x8000$ $V(e_0,y) = 0x8000$ $V(e_0,z) = 0x40000000$ In order to determine which values are assigned when no overflow occurs, keep track of which constant (if any) a variable equals to, which constant it is known not to be equal to and whether a variable contains a range of bits from x, y and z. The value lattice in this case is the product:

$$\Lambda = C \times \overline{C} \times \Gamma$$

where the lattice $\Gamma$ has the same meaning as in example A. It is used to keep track of bit ranges. C is the lattice commonly used in constant propagation. The $\overline{C}$ lattice contains the same elements as C, but it has the inverted meaning: a variable a is assigned $\text{const} \in \overline{C}$ if it is known never to be equal to the constant.

Interpretation for the arithmetic operations is straight-forward. Special care must be taken to define rules for interpretation of comparisons. The equality cmpeq test is interpreted via the following rules:

$$cmpeq(\langle c_1,\_,\_\rangle, \langle c_2,\_,\_\rangle) = \begin{cases} \langle 1, \perp, \perp \rangle & \text{if } c_1 = c_2 \\ \langle 0, \perp, \perp \rangle & \text{if } c_1 \neq c_2 \end{cases}$$

$$cmpeq(\langle c,\_,\_\rangle, \langle \_, c,\_\rangle) = \langle 0, \perp, \perp \rangle$$

Similar rules are defined for other comparisons. A special rule for multiplication is:

mul ($\langle 0x8000, \_,\_ \rangle, \langle \_, 0x8000, \_\rangle) = \langle \_, 0x40000000, \_\rangle$ I.e. if we multiply 0x8000 with something that is not 0x8000, we can never get 0x40000000.

Special care must also be taken not to create contradictory representations such as $\langle 0, 0, \_ \rangle$: never create a tuple with both the element of C and that of $\overline{C}$ being set to a constant. If the latter is set to a constant, set the former to $\perp$.

In order to simplify analysis, divide the definition of shifted saturating multiplication into three cases, two of which handle the non-overflow condition, giving the pattern function:

$$f(x, y, z) = \begin{cases} z \gg (k-1) & \text{if } x \neq 0 \times 8000 \\ z \gg (k-1) & \text{if } y \neq 0 \times 8000 \\ \text{Max32} \gg k & \text{if } x = y = 0 \times 8000 \end{cases}$$

In the first case, abstract interpretation is performed with the initial value of x at the candidate edge being $\langle \perp, 0x8000, x_{0,0,15} \rangle$. In the second case, similar lattice value is given to y. In both cases, the witness z is assigned $\langle \perp, 0x40000000, z_{0,0,31} \rangle$. In the third, overflow, case start with the assignment:

$V(e_0,x) = \langle 0x8000, \perp, x_{0,0,15} \rangle$ $V(e_0,y) = \langle 0x8000, \perp, x_{0,0,15} \rangle$ $V(e_0,z) = \langle 0x40000000, \perp, z_{0,0,31} \rangle$ D. Add With Carry Given an addition operation z=x+y and a carry-in variable $c_{in}$, identify variables that hold the carry-out bit. Identifying the result of the addition is quite simple: use global value numbering to identify variables that hold $z+c_{in}$. An important assumption, based on prior program analysis (such as range propagation), is that $c_{in} \in \{0,1\}$. An example is:

```
1:  int addc(int x, int y,
2:           int c_in, int *p_c_out){
3:      int z = x + y;
4:      int c_internal;
```

-continued

```
 5:     int c_out;
 6:     assert (c == 0 || c == 1);
 7:     if ((x < 0) && (y < 0)) {
 8:        c_internal = 1;
 9:     }
10:     else if (MIN32 & ((x ^ y) & ~z)) {
11:        c_internal = 1;
12:     }
13:     else {
14:        c_internal = 0;
15:     }
16:     if (z == 0xFFFFFFFF) { c_out = c_in; }
17:     else { c_out = c_internal; }
18:     *p_c_out = c_out;
19:     return (z + c_in);
20:       }
```

To define the pattern function for the carry-out bit, first define the "carry internal" bit, as:

$$\text{CarryInternal}(x,y,z) \equiv (\hat{\sigma}_x \sigma_y) \vee ((\sigma_x \oplus \sigma_y) \neg \sigma_z)$$

This is the carry-out bit in the addition $z=x+y$, without the presence extra carry-in bit. In the presence of the carry-in bit, the carry-out function is defined as:

$$\text{Carry}(x, y, z, c_{in}) = \begin{cases} c_{in} & \text{if } z = 0 \times FFFFFFFF \\ \text{CarryInternal}(x, y, z) & \text{otherwise} \end{cases}$$

This is the pattern function. Re-use some of the process of the previous sections in order to detect carry-out computations. Abstract interpretation is performed under the assumptions:

$$z = 0 \times FFFFFFFF$$

$$z \neq 0 \times FFFFFFFF$$

The "equals-to-constant" and "not-equals-to-constant" information needs to be propagated. We utilize the C and C lattices that were introduced for detection of saturating multiplication. Detect computations of CarryInternal, which is a Boolean predicate in the sign bits $\sigma_x$, $\sigma_y$, $\sigma_z$ and the carry-in bit $c_{in}$. For this we utilize the $\Phi^{32}$. Overall, the value lattice is $= C \times C \times \Phi^{32}$.

Observe that the condition z=0xFFFFFFFF also implies that x and y must have different signs. So the abstract interpretation for the first case, is performed under the assumption:

$$P_1 \equiv (\sigma_x \oplus \sigma_y) \hat{\sigma}_z$$

Ar the candidate edge, the variable z is assigned the lattice value:

$$V(e_0,z) = \langle 0xFFFFFFFF, \bot, \langle 1,1,\ldots,1 \rangle \rangle$$

To implement the z≠0xFFFFFFFF assumption, assign z the initial lattice value:

$$V(e_0,z) = \langle \bot 0xFFFFFFFF, \langle \sigma_z, \bot, \ldots, \bot \rangle \rangle$$

E. Arithmetic Shift Computation.

ANSI C standard does not define which bits the right shift operator "x>>y" brings in from the left when the first operand is of a signed type. The question is whether it brings in the sign bit of x or zero. In the first case, it would be called "arithmetic shift", in the second—"logical shift".

Here are a couple of portable implementations of arithmetic shift:

```
int arith_shift_1 (int x, int y) {
    if (y < 0) {
        return x << (-y);
    }
    else if (y >= 31) {
        return (x < 0) ? -1 : 0;
    }
    else {
        int z = (x >> y);
        int t = (1 << (31 - y));
        if (z & t) {
            z = z | (0xFFFFFFFF << (32 - y));
        }
        return z;
    }
}
int arith_shift_2 (int x, int y) {
    if (y < 0) {
        return x << (-y);
    }
    else if (y >= 31) {
        return (x < 0) ? -1 : 0;
    }
    else {
        if (x < 0) {
            return ~(~x >> y);
        }
        else {
            return x >> y;
        }
    }
}
```

Observe that (a) variables get shifted by the amount that is linear in y, (b) most of the values are divided into two bit ranges [0:p(y)] and [p(y)+1,31] where p(y) is a linear function of y. The values of the two bit ranges are either constant, or a sub-range of x, possibly inverted.

Divide the definition of arithmetic shift into 5 cases:

$$Shra(x, y) = \begin{cases} (x \ll (-y)) & \text{if } y < 0 \\ -1 & \text{if } y \geq 31 \wedge x < 0 \\ 0 & \text{if } y \geq 31 \wedge x \neq 0 \backslash \\ (x \gg y) & \text{if } 0 \leq y \leq 30 \text{ and } x \geq 0 \\ \neg(\neg x \gg y) & \text{if } 0 \leq y \leq 30 \text{ and } x < 0 \end{cases}$$

(The sign-extension behavior of the "native" right shift operator in the above formula is irrelevant.)

In order to determine which statements are executed for each of the five cases above, propagate ranges and the "equals-to-constant" and "not-equals-to-constant" properties. In order to determine which variables equal to x<<(-y), -1, 0, x>>y or ¬(¬x>>y), perform global value numbering. Observe that one is just reusing the value lattices that were either introduced earlier or are expected to be implemented in a mature compiler.

The present methods allow the compiler to substitute a hardware implementation, where available for the software implementation of the operator when identity has been recognized. The program may be transformed so that the value of each variable v that takes on the value of the function f(x,y,...) is computed by the available function f(x,y,...) by adding the invocation of the instruction t=f(x,y,...); and replacing each reference to variable v at each statement s, such that the value of v at s equals f(x,y,...), with the reference to t. The instructions that are unused after the program transformation are eliminated by dead-code elimination. Where the mathematical function f(x, y, ... ) is computable in hardware, the program may be transformed so that the value of each variable v that takes on the value of the function f(x,y, ... ) is computed by the available hardware instruction for f(x,y, ... ).

The above techniques for automatic recognition of saturating arithmetic operations have fairly low compile-time overhead. Further, these techniques are fairly general in that they recognize underlying saturating arithmetic operations even when expressed using considerably different idioms. The generality of this approach arises from the fact that instead of doing a syntactic pattern match, the underlying semantic concept is exploited in a systematic fashion. Further, abstract interpretation allows application of this reasoning in systematically, as opposed to ad-hoc fashion. Once the appropriate semantic elements have been determined and the lattices constructed, the interpretation for each operation can be systematically determined.

Although the present invention has been described and illustrated in detail, it is to be clearly understood that this is done by way of illustration and example only and is not to be taken by way of limitation. The scope of the present invention are to be limited only by the terms of the appended claims.

What is claimed is:

1. A method of transforming a first code, the method comprising:
    identifying a function having an input;
    generating a first Boolean expression describing the function in terms of the bits of an input variable;
    identifying a location in the first code where an output variable instance is assigned a result of a program statement;
    generating a second Boolean expression for an instance of the program statement describing the instance in terms of the bits of an input variable;
    generating a third Boolean expression for an instance of the program statement describing the condition under which the instance is executed and in terms of the bits of an input variable; and
    converting the program statement in the first code into the function in a second code when the condition for executing an instance of the program statement is satisfied and the second Boolean expression is equal to the first Boolean expression.

2. The method according to claim 1, wherein the function is computable in hardware.

3. The method according to claim 2, wherein the first code is converted so that the value of the output variable of an instance of the program statement is computed by a hardware instruction for the function.

4. The method according to claim 3, wherein converting includes:
    adding an invocation instruction equal to the function; and
    replacing an output variable reference instance, such that the output variable instance is assigned the function by referencing the invocation instruction.

5. The method according to claim 4, further comprising eliminating instructions in the second code by dead-code elimination.

6. The method according to claim 2, wherein converting includes:
    adding an invocation instruction equal to the function; and
    replacing an output variable reference instance, such that the output variable instance is assigned the function by referencing the invocation instruction.

7. The method according to claim 6, further comprising eliminating instructions in the second code by dead-code elimination.

8. A method of transforming a first code, the method comprising:
    identifying a function having an one input;
    generating a first plurality of Boolean expressions describing the function in terms of the bits of an input variable, the expressions having predicates;
    identifying a location in the first code where an output variable instance is assigned a result of a program statement;
    generating a second plurality of Boolean expressions for an instance of the program statement describing the instance in terms of the bits of an input variable, wherein the number of expressions generated is equal to the number of predicates;
    generating a third plurality of Boolean expressions for an instance of the program statement describing the condition under which the instance is executed and in terms of the bits of each input variable, wherein the number of expressions generated is equal to the number of predicates; and
    converting the program statement in the first code to the function in a second code when the condition for executing an instance of the program statement and a corresponding predicate are satisfied and the second Boolean expression for the corresponding predicate is equal to the first Boolean expression for the corresponding predicate.

9. The method according to claim 8, wherein the function is computable in hardware.

10. The method according to claim 9, wherein the first code is converted so that the value of the output variable of an instance of the program statement is computed by a hardware instruction for the function.

11. The method according to claim 10, wherein converting includes:
    adding an invocation instruction equal to the function; and
    replacing an output variable reference instance, such that the output variable instance is assigned the function by referencing the invocation instruction.

12. The method according to claim 10, further comprising eliminating instructions in the second code by dead-code elimination.

13. The method according to claim 9, wherein converting includes:
    adding an invocation instruction equal to the function; and
    replacing an output variable reference instance, such that the output variable instance is assigned the function by referencing the invocation instruction.

14. The method according to claim 13, further comprising eliminating instructions in the second code by dead-code elimination.

15. The method according to claim 8, wherein determining when the condition for executing an instance of the program statement and a corresponding predicate are satisfied and a second expression for the corresponding predicate is equal to the first expression for the corresponding predicate includes using an approximation of the values of the generated expression.

16. The method according to claim 15, wherein the approximation is a combination of: constant propagation, global value numbering, range propagation applied to whole variables, or range propagation applied to bit-ranges of variables.

17. The method according to claim 15, wherein the approximation is based on a predicate.

18. The method according to claim 15, wherein the approximation is based on an expression of the first plurality of expressions.

19. A system for transforming code, the system comprising:
a first code; and
a processor configured to identify a function having an input, generate a first Boolean expression describing the function in terms of the bits of an input variable, identify a location in the first code where an output variable instance is assigned a result of a program statement, generate a second Boolean expression for an instance of the program statement describing the instance in terms of the bits of an input variable, generate a third Boolean expression for an instance of the program statement describing a condition under which the instance is executed and in terms of the bits of an input variable, and convert the program statement in the first code into the function in a second code when the condition for executing an instance of the program statement is satisfied and the second Boolean expression is equal to the first Boolean expression.

20. The system according to claim 19, wherein the processor is further configured to compute the function in hardware.

21. The system according to claim 20, wherein the processor is further configured to convert the first code so that the value of the output variable of an instance of the program statement is computed by a hardware instruction for the function.

22. The system according to claim 21, wherein the processor is further configured to:
add an invocation instruction equal to the function; and
replace an output variable instance, such that the output variable instance is assigned the function by referencing the invocation instruction.

23. The system according to claim 22, wherein the processor is further configured to eliminate instructions in the second code by dead-code elimination.

24. The system according to claim 19, wherein the processor is further configured to:
add an invocation instruction equal to the function; and
replace an output variable instance, such that the output variable instance is assigned the function by referencing the invocation instruction.

25. The system according to claim 24, wherein the processor is further configured to eliminate instructions in the second code by dead-code elimination.

26. A system for transforming a first code, the system comprising:
means for identifying a function having an input;
means for generating a first Boolean expression describing the function in terms of the bits of an input variable;
means for identifying a location in the first code where an output variable instance is assigned a result of a program statement;
means for generating a second Boolean expression for an instance of the program statement describing the instance in terms of the bits of an input variable;
means for generating a third Boolean expression for an instance of the program statement describing a condition under which the instance is executed and in terms of the bits of an input variable; and
means for converting the program statement in the first code into the function in a second code when the condition for executing an instance of the program statement is satisfied and the second Boolean expression is equal to the first Boolean expression.

27. A computer-readable medium containing a set of instructions that causes a computer to perform a process comprising:
identifying a function having an input;
generating a first Boolean expression describing the function in terms of the bits of an input variable;
identifying a location in the first code where an output variable instance is assigned a result of a program statement;
generating a second Boolean expression for an instance of the program statement describing the instance in terms of the bits of an input variable;
generating a third Boolean expression for an instance of the program statement describing a condition under which the instance is executed and in terms of the bits of an input variable; and
converting the program statement in the first code into the function in a second code when the condition for executing an instance of the program statement is satisfied and the second Boolean expression is equal to the first Boolean expression.

28. A system for transforming code, the system comprising:
a first code; and
a processor configured to identify a function having an input, generate a first plurality of Boolean expressions describing the function in terms of the bits of an input variable, the expressions having predicates, identify a location in the first code where an output variable instance is assigned a result of a program statement, generate a second plurality of Boolean expressions for an instance of the program statement describing the instance in terms of the bits of an input variable wherein the number of expressions generated is equal to the number of predicates, generate a third plurality of Boolean expressions for an instance of the program statement describing a condition under which the instance is executed and in terms of the bits of each input variable wherein the number of expressions generated is equal to the number of predicates, and converting the program statement in the first code to the function in a second code when the condition for executing an instance of the program statement and a corresponding predicate are satisfied and the second Boolean expression for the corresponding predicate is equal to the first Boolean expression for the corresponding predicate.

29. The system according to claim 28, wherein the processor is further configured to compute the function in hardware.

30. The system according to claim 29, wherein the processor is further configured to convert the first code so that the value of the output variable of an instance of the program statement is computed by a hardware instruction for the function.

31. The system according to claim 30, wherein the processor is further configured to:
add an invocation instruction equal to the function; and
replace an output variable instance, such that the output variable instance is assigned the function by referencing the invocation instruction.

32. The system according to claim 31, wherein the processor is further configured to eliminate instructions in the second code by dead-code elimination.

33. The system according to claim 28, wherein the processor is further configured to:
add an invocation instruction equal to the function; and
replace an output variable instance, such that the output variable instance is assigned the function by referencing the invocation instruction.

34. The system according to claim 33, wherein the processor is further configured to eliminate instructions in the second code by dead-code elimination.

35. The system according to claim 28, wherein the processor is further configured to determine when the condition for executing an instance of the program statement and a corresponding predicate are satisfied and the second Boolean expression for the corresponding predicate is equal to the first Boolean expression for the corresponding predicate using an approximation of the values of the generated expressions.

36. The system according to claim 35, wherein the approximation is a combination of: constant propagation, global value numbering, range propagation applied to whole variables, or range propagation applied to bit-ranges of variables.

37. The system of claim 35, wherein the approximation is based on a predicate.

38. The system of claim 35, wherein the approximation is based on an expression of the first plurality of expressions.

* * * * *